Patented Nov. 3, 1942

2,300,734

UNITED STATES PATENT OFFICE 2,300,734

PROCESS OF MAKING CHROMAN COMPOUNDS

Lee Irvin Smith, Minneapolis, Minn., assignor to Regents of The University of Minnesota, Minneapolis, Minn., a corporation of Minnesota No Drawing. Application July 14, 1939, Serial No. 284,523

5 Claims. (Cl. 260—333)

This invention relates to organic intermediates which are useful in the preparation of para hydroxy coumaranes and chromans, and to methods for preparing such intermediates. It is an object of the invention to provide such methods and intermediates.

In carrying out the present invention diethers of hydroquinone, having vacant at least one position ortho to one of the ether radicals, is simultaneously subjected to the action of a formaldehyde and halide acid. This results in the formation of the halo-alkyl derivative of the hydroquinone diether. The thus formed halo-alkyl derivative is used to alkylate an alkali derivative of a β-keto ester, which results in the formation of desirable primary intermediates of the present invention.

It is accordingly an object of the invention to provide such a method and intermediates.

According to further aspects of the invention the aforesaid primary intermediates may be hydrolyzed to form new and useful secondary intermediates and these may be further reacted upon by Grignard reagents to give desirable tertiary intermediates, capable of transformation to chroman products.

Further objects of the invention are therefore the provision of such new secondary and tertiary intermediates and the provision of methods of making and transforming the same.

It is also specifically an object of the invention to utilize any known or discovered effect exhibited by the compounds of the present invention, including medical, biological and any other effects.

Other objects are those implied by and inherent in the invention described and claimed herein.

In forming the aforesaid primary intermediates the starting material is an ether (or ester) of hydroquinone, having vacant at least one position ortho to one of the ether (or ester) radicals. Such compounds may be illustrated by the following structure:

I 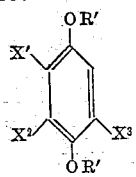

where R' may be an alkyl radical such as methyl, ethyl, propyl, or the like, and X', X² and X³ are either hydrogen atoms or alkyl radicals.

The hydroquinone compound I is then simultaneously subjected to the action of formaldehyde, formaldehyde and hydrochloric acid which are preferred because of their favorable reactivity and low cost. Other halo-acids such as hydrobromic acid may, however, be used, and formaldehyde polymers such as paraformaldehyde may be substituted for aqueous formaldehyde.

The combined reaction of the aldehyde and halo-acid upon the hydroquinone ether structure I, results in the formation of the corresponding halo-alkyl derivative of the hydroquinone compound, which derivative may be illustrated by the following formula:

II 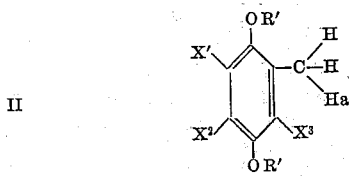

where, as in Structure I, R' is an alkyl radical, X', X² and X³ are alkyl radicals, and Ha is a halogen atom.

The thus formed compound, II, is then used to alkylate a β-keto ester, a β-diketone, or a similar compound, alkali derivatives of these materials being used for this purpose. The sodium derivative of aceto-acetic ester being preferred because of its simplicity and ready availability. This alkylation, which yields the primary intermediate III of the present invention, may be represented by the following equation:

II+R²COCH₂COOC₂H₅

↓ (NaOC₂H₅)

III 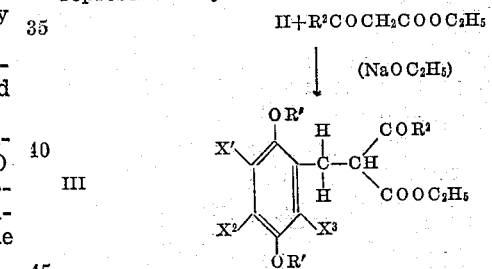

in which R', X', X² and X³ are defined above and R² is an alkyl or aryl group.

The primary intermediate structure, III, is variously useful in organic syntheses. In one such synthesis (which is a part of the present invention) the primary intermediate structure III forms the starting material for the production of the secondary intermediates of the present invention. This is accomplished by hydrolysis which is carried out by the use of alkalies such as sodium or potassium hydroxide, by the use of water (steam) under pressure. The thus hydrolyzed compound, which is the secondary intermediate of the present invention, may be represented by the following structure:

IV
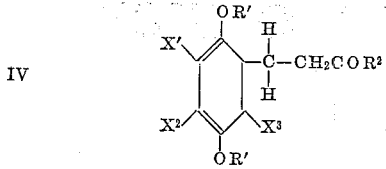

The thus formed secondary intermediates, which are generally useful in organic syntheses, may be processed according to the present invention to give tertiary intermediates, Structure V below, by suitable reaction utilizing Grignard reagents. This may be illustrated by the following structure:

V
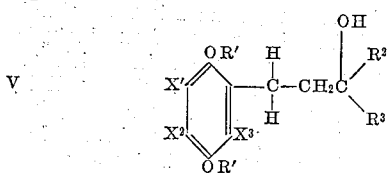

The tertiary intermediates, Structure V, are useful in organic syntheses, particularly as intermediates in the production of para hydroxy chromans. This may be accomplished by cleaving the protective groups R' from the intermediate, Structure V, and cyclizing the resultant products, specifically by acid cleavage or action of a Grignard reagent at an elevated temperature.

By properly choosing the Grignard reagent to be used with the secondary intermediate, it is possible to make a wide variety of chromanes, for example, by using $C_{16}H_{33}MgX$. This compound $C_{16}H_{33}MgX$ can be obtained from hexahydrofarnesol by making hexahydrofarnesol bromide, reacting the Grignard reagent prepared therefrom with formaldehyde to form an alcohol, making the bromide of the latter, and reacting with magnesium. The Grignard $C_{16}H_{33}MgX$ is used to treat the secondary intermediate thereby to give the tertiary intermediate, which may then be treated by reduction of the product, hydrolyzing off the protective groups, and cyclizing, to thus yield alpha-di-tocopherol.

The foregoing procedures may be illustrated by the following examples, which however must not be considered as limitations upon the inventions claimed.

Preparation of the halo-alkyl derivatives as a step in the preparation of the primary intermediates, is illustrated by the following example:

STEP A.—*Preparation of primary intermediate using a hydroquinone dimethyl ether*

Fifteen and eight-tenths grams of 3.6-dimethoxy pseudocumene, 65 grams of concentrated hydrochloric acid, and 15 grams of formalin were stirred at 60–70° C. for eight hours while a stream of dry hydrogen chloride was passed therethrough. The reaction mixture was extracted with ethyl ether. Evaporation of the ether left a nearly colorless oil (yield 21 grams or 100%) which solidified upon cooling. The product was pure and melted at 67–68° C. It gave an immediate precipitate with alcoholic silver nitrate. This compound is 2.5-dimethoxy-3,4,6-trimethyl benzylchloride.

*Preparation of primary intermediate using a hydroquinone diethyl ether*

When stoichiometrically equivalent amount of diethoxy pseudocumene is substituted for dimethoxy pseudocumene of the preceding paragraph, the remaining reactants and conditions being as set forth therein, 2,5-diethoxy-3,4,6-trimethyl benzyl chloride is obtained in nearly quantitative yields, the melting point of this derivative being 86–87° C.

After making the halo-alkyl derivatives, the preparation of the primary intermediate is continued as illustrated by the following example:

STEP B.—*Alkylation step utilizing 2.5-dimethoxy-3,4,6-trimethyl benzylchloride as the halide*

Twelve grams of aceto acetic ester was added to a solution of 2.12 grams of sodium in 100 cc. of absolute ethanol. This mixture was well shaken while a solution of 21 grams of the previously prepared 2.5-dimethoxy-3,4,6-trimethyl-benzylchloride of Step A in 100 cc. absolute ethanol, was slowly added. After standing 3 hours, the mixture was warmed on the steam bath for 30 minutes, at which time it was neutral to wet litmus. Water was then added, the solution was made slightly acid with dilute sulfuric acid and most of the alcohol removed under reduced pressure. The aqueous solution was extracted with ethyl ether and after the ether was evaporated there remained as a residual oil the primary intermediate compound of the present invention, Structure III.

The conversion of the primary intermediate to the secondary intermediate is illustrated by the following example:

STEP C.—*Hydrolysis step utilizing the product of Step B*

The quantity of primary intermediate residual oil of Step B was stirred with an excess of 5% aqueous sodium hydroxide for four hours at room temperature, and then 50 cc. of ethanol was added and the mixture refluxed for 30 minutes. Fifty cc. of water were then added, the solution was made acid to Congo red with 30% sulfuric acid, and warmed with shaking until the solid which was present melted. After cooling, the solid secondary intermediate appeared and was removed. The yield was 22 grams and the solid melted at 63–64° C. After purification by crystallization several times from aqueous ethyl alcohol it melted at 78–78.5° C.

The secondary intermediate compounds may be converted to the tertiary intermediates of the present invention by the Grignard procedure which is illustrated by Step D below, in which the secondary intermediate (a ketone) is the butanone compound 1-(2,5-dimethoxy-3,4,6-trimethyl phenyl) butanone-3.

In the Grignard conversion of the secondary intermediate to the tertiary intermediate, exemplified by the procedure of Step D, the reaction appears for the most part to be a simple addition of the carbonyl group. The tertiary intermediate is obtained in good yields and it appears to be an alcohol as is evidenced by the formation of the dinitrobenzoate derivative. Where, however, the Grignard reaction is continued beyond the addition stage, at elevated temperatures, and there is an excess of Grignard reagent present, demethylation appears to take place in addition to the simple addition reaction. This is exemplified by the following:

STEP D.—*Grignard conversion*

A solution of 1.43 grams of the ketone, 1-(2,5-dimethoxy-3,4,6-trimethyl phenyl) butanone-3, was dissolved in 30 cc. absolute ether and the solution added to methyl magnesium iodide prepared from 0.69 gram magnesium and 4.06 grams methyl iodide. After complete reaction, the ether was distilled off. The residue was then heated at 180° C. for 45 minutes and after cooling the mixture was hydrolyzed with ice and 30% sulphuric acid, and the resultant hydroquinone product extracted with ether. When the solution was shaken with air it became yellow indicating that the hydroquinone product was oxidizable to the yellow quinone. The solution was therefore shaken with aqueous sodium hydrosulfite which decolorized the ether solution, and the ether was evaporated. A yellow oil remained which did not crystallize.

The oil residue was acetylated to the acetyl derivative by refluxing for 30 minutes with 12 cc. acetic anhydride, 1 gram zinc dust and 3 grams fused sodium acetate. The mixture was then poured into water and extracted with ether. The ether solution was washed with water, dilute sodium hydroxide solution, and then with water, dried and evaporated. The resultant acetate product was a viscous oil which did not crystallize.

The viscous acetate was dissolved in 500 cc. ethanol and 100 cc. concentrated nitric acid was added to the solution. A deep red color was developed in the mass when heated on the steam bath for 30 minutes. This is characteristic of 6-hydroxy chromans or their oxidation products.

It is obvious that many variations may be made in the methods herein described without departing from the spirit of the invention described and claimed.

I claim:

1. The process of preparing tocopherol-like chroman compounds which comprises admixing di-ethoxy pseudocumene, formaldehyde, and hydrogen chloride in the presence of hydrochloric acid, separating the thus formed reaction product, treating the same with the sodium salt of aceto-acetic acid ester, hydrolyzing the thus formed product, subjecting the hydrolyzed product to the action of a Grignard reagent, and then converting the resultant product to the corresponding hydroxy chroman compound.

2. The process of preparing tocopherol-like chroman compounds which comprises admixing di-alkoxy pseudocumene, formaldehyde, and gaseous hydrogen chloride in the presence of aqueous hydrochloric acid, separating the thus formed reaction product, treating the same with the sodium salt of aceto-acetic acid ester, hydrolyzing the thus formed product, subjecting the hydrolyzed product to the action of a Grignard reagent and then converting the resultant product to the corresponding hydroxy chroman compound.

3. The process of preparing tocopherol-like chroman compounds which comprises admixing di-methoxy pseudocumene, formaldehyde, and gaseous hydrogen chloride in the presence of aqueous hydrochloric acid, separating the thus formed reaction product, treating the same with the sodium salt of aceto-acetic acid ester, hydrolyzing the thus formed product, subjecting the hydrolyzed product to the action of a Grignard reagent, and then converting the resultant product to the corresponding hydroxy chroman compound.

4. The process of preparing tocopherol-like chroman compounds, which comprises admixing di-alkoxy pseudocumene, formaldehyde, and gaseous hydrogen chloride in the presence of aqueous hydrochloric acid, separating the thus formed reaction product, treating the same with sodium salt of aceto-acetic acid ester, hydrolyzing the thus formed product, subjecting the hydrolyzed product to the action of a Grignard reagent, continuing the treatment with excess Grignard reagent at an elevated temperature and then treating the thus formed product with an acid.

5. The process of preparing tocopherol-like chroman compounds which comprises admixing di-alkoxy pseudocumene, formaldehyde and a gaseous hydrogen halide selected from the group consisting of hydrogen chloride and hydrogen bromide in the presence of an aqueous acid selected from the group consisting of hydrochloric and hydrobromic acid, separating the thus formed reaction product, treating the same with an alkali derivative of a compound selected from the group consisting of beta-keto ester and beta-diketone, hydrolyzing the thus formed product, subjecting the hydrolyzed product to the action of a Grignard reagent and then converting the resulting product to the corresponding hydroxy chroman compound.

LEE IRVIN SMITH.